Inventor
Frederick Pocock
BY Watson, Cole, Grindle & Watson
Attorneys

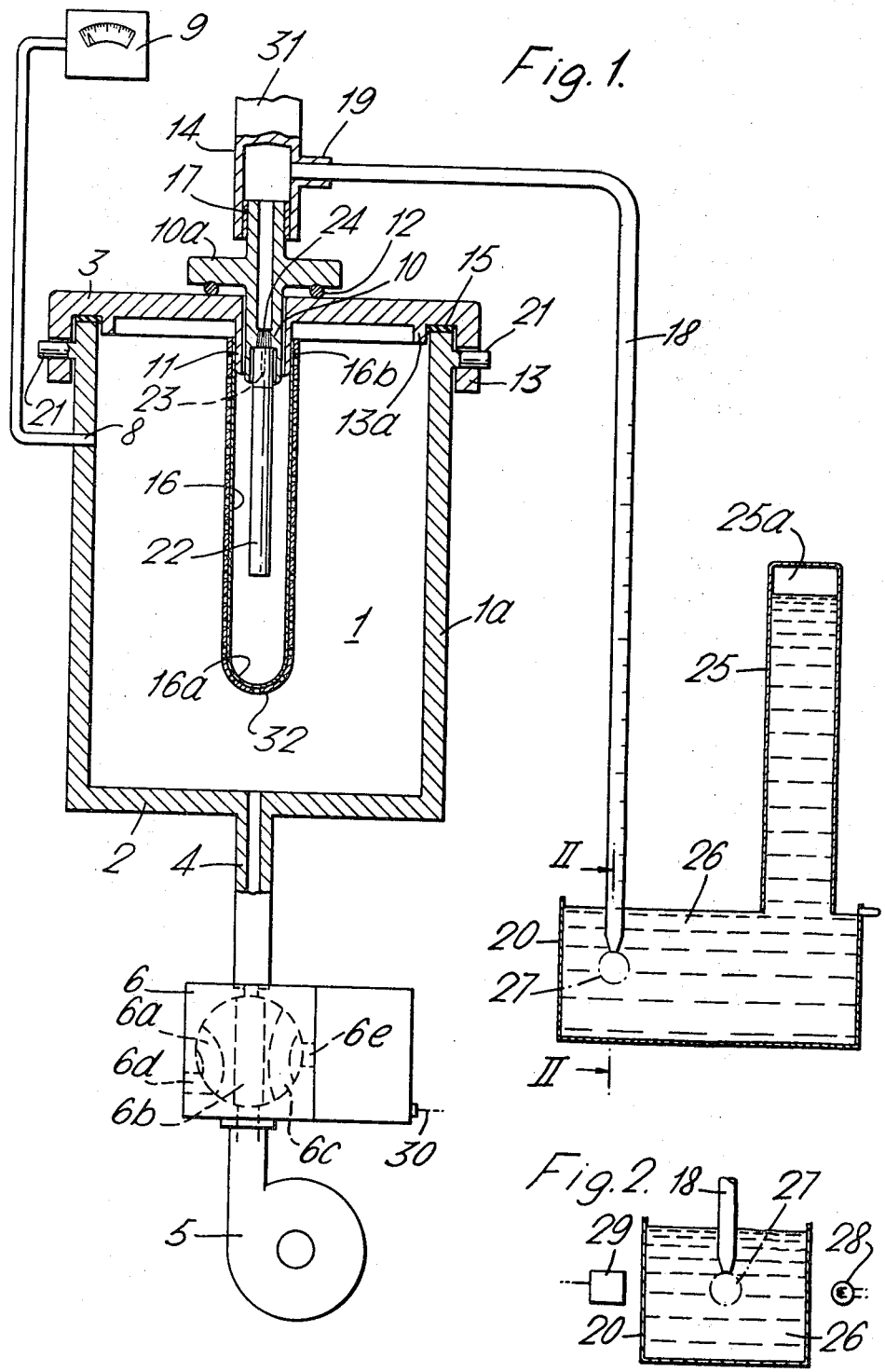

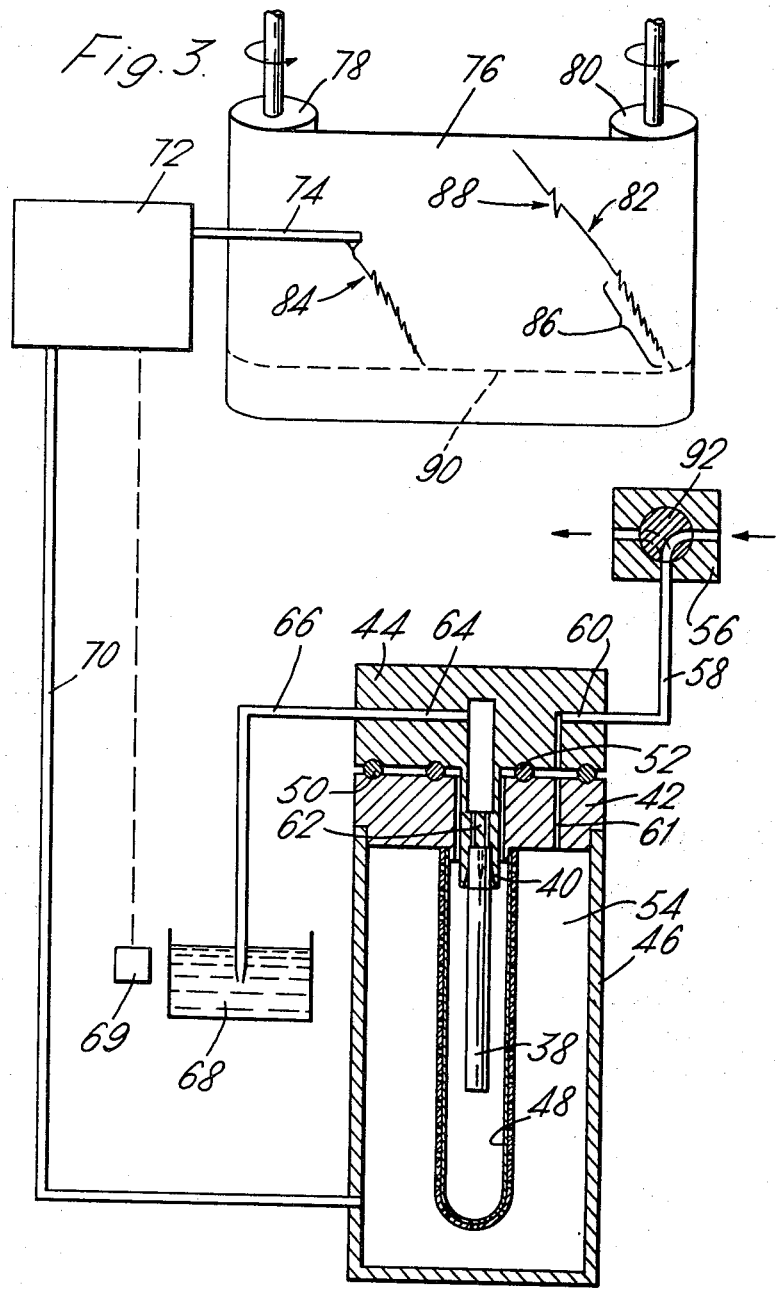

United States Patent Office 3,535,922
Patented Oct. 27, 1970

3,535,922
DEVICES FOR TESTING THE ELASTICITY OF TOBACCO AND LIKE MATERIALS
Frederick Pocock, Deptford, London, England, assignor to Molins Machine Company Limited, London, England, a corporation of Great Britain
Continuation-in-part of application Ser. No. 741,550, July 1, 1968. This application Jan. 24, 1969, Ser. No. 814,489
Claims priority, application Great Britain, Jan. 26, 1968, 4,256/68
Int. Cl. G01n 3/08
U.S. Cl. 73—94                                      15 Claims

ABSTRACT OF THE DISCLOSURE

A device for testing elasticity and other physical characteristics of materials such as tobacco has a material chamber, for receiving a test sample, which may be in the form of a cigarette, and a pressure chamber to which pressure fluid is fed. The chambers are separated by a flexible diaphragm and means are provided for measuring volume variations in the material chamber as the fluid pressure is varied.

---

This application is a continuation-in-part of my copending application Ser. No. 741,550 filed July 1, 1968, now abandoned.

This invention relates to devices for testing the physical characteristics, for example the elasticity, of tobacco and like materials. While the present invention has primarily been evolved for use in relation to tobacco it will be apparent as this specification proceeds that the devices embodying the invention are also applicable to the testing of other materials.

When referring to elasticity herein, the measure of elasticity which a device embodying the invention may be used to determine may be the bulk modulus of elasticity. In relation to tobacco a measure also used is the so-called "filling value" which is defined as internal pressure divided by density and this also can be found by use of a device embodying the present invention.

It is an object of the present invention to provide a testing device for the purpose indicated which while relatively simple in construction and operation may yet be employed to give measurements of physical characteristics such as the elasticity of bulk tobacco or of completed cigarettes, of the like, including measurements based upon the "recovery" of the tobacco or other material being tested, i.e. its behaviour when, after compression, the pressure imposed upon it is relaxed.

According to the invention there is provided a device for testing the elasticity and other physical characteristics of tobacco and like materials, comprising a pressure chamber, means for supplying a fluid under pressure to said chamber, a material chamber separated from said pressure chamber by a flexible diaphragm impermeable to said fluid, and means for measuring variations in the volume of said material chamber in response to variations in said fluid pressure.

The flexible diaphragm may be of natural or synthetic rubber or of any other material having generally similar mechanical characteristics. It is however preferable that the diaphragm should be so arranged that the material of the diaphragm is not stretched when the maximum fluid pressure required is applied. In a preferred arrangement the pressure chamber is of generally cylindrical form and the diaphragm is in the form of a tube having one end closed and accommodated within the pressure chamber, the other end of said tube being open and being secured to a rigid pipe projecting into the pressure chamber through one wall thereof.

While the pressure fluid employed may be either a liquid or a gas, it is convenient, at least when testing tobacco, to employ air as the pressure fluid. It has been found experimentally that when using air as the pressure fluid a convenient arrangement is to provide a connection from a source of compressed air, via a settlement pressure-reducing valve, to the pressure chamber and also to provide a small air-bleed hole in a wall of the pressure chamber. With this arrangement it has been found in practice that the air pressure in the chamber can readily be set to a desired value and it is also preferred to measure the actual air pressure in the chamber by providing a manometer or other pressure-indicating means connected to the pressure chamber at a point spaced from the connection by which air is admitted to said chamber and from the aforesaid air-bleed hole.

It will be appreciated that the construction of the pressure chamber will be determined by the material or materials to be tested in the device as for different materials different maximum fluid pressures will be required. Where tobacco is to be tested the maximum pressure required is relatively low, generally being less than five pounds per square inch and in such circumstances it is convenient to construct the pressure chamber at least in part of transparent material such as that obtainable under the registered trakemark "Perspex."

In the preferred form of device mentioned above, in which the diaphragm takes the form of a tube, it is desirable to ensure that none of the material under test can leave the flexible tube, and for this purpose we prefer to provide a perforated spacer to confine the material under test to the flexible tube.

In a preferred device according to this invention an indication of the reduction in volume of the material chamber during testing is obtained by means of a flow connection from the material chamber to a point below the surface of liquid in a bubbler bath, so that a reduction in the volume of the material chamber as a result of fluid pressure in the pressure chamber causes air to be driven out of the material chamber (assuming that the gas with the tobacco is air, as it normally would be) and to bubble out in the bubbler bath.

The material chamber may be filled with bulk tobacco, or alternatively it may contain one or more completed cigarettes during testing.

A measure of the volume reduction may be obtained by counting the bubbles, and for this purpose we may provide a light source and a photo-electric cell on either side of the path of the bubbles so that the cell emits electric pulses as bubbles pass between the source and the cell, the latter being connected to a counter.

There may be a connection from the pressure chamber to a pressure indicator or recorder which receives a signal from the photo-electric cell which indicates and preferably records the pressure or pressures at which a bubble is released into the bubbler bath. This is especially useful where one cigarette at a time is tested in the material chamber. During testing, when the compressed air or other gas flows into the pressure chamber, the diaphargm first collapses around the cigarette, during which stage air is driven out of the material chamber and bubbles out in the bubbler bath. Then as the fluid pressure builds up in the pressure chamber, there is a short period during which no further air bubble is driven out until after the pressure in the pressure chamber has built up to a value above the filling pressure of the tobacco in the cigarette. When the pressure in the pressure chamber has passed the tobacco filling pressure by an amount sufficient to cause another air bubble to break out in the bubbler bath, the pressure at which that occurs is indicative not only of the filling pressure of the tobacco in the cigarette, but also of the firmness of the cigarette which may be likened to the spring rate of the tobacco.

Where the device is used to test or check the firmness of individual cigarettes, there may be an arrangement for locating and supporting the cigarette in position in the material chamber.

The means for measuring variations in the volume of the material chamber may take other forms; for example said means may take the form of a water manometer and this should have a sufficient capacity to accommodate the maximum volume of air (or other fluid) which can be displaced from the material chamber during testing.

In order that the invention may be well understood, preferred embodiments thereof will now be described with reference to the accompanying drawings. In these drawings:

FIG. 1 is a general view of one device, sectioned so as to show the appropriate details;

FIG. 2 shows a bubble counter arrangement which may be incorporated in the FIG. 1 ararngement;

FIG. 3 is a diagrammatic view of a different system which can be used to give repeated test results recorded on a moving band;

Figure 4:
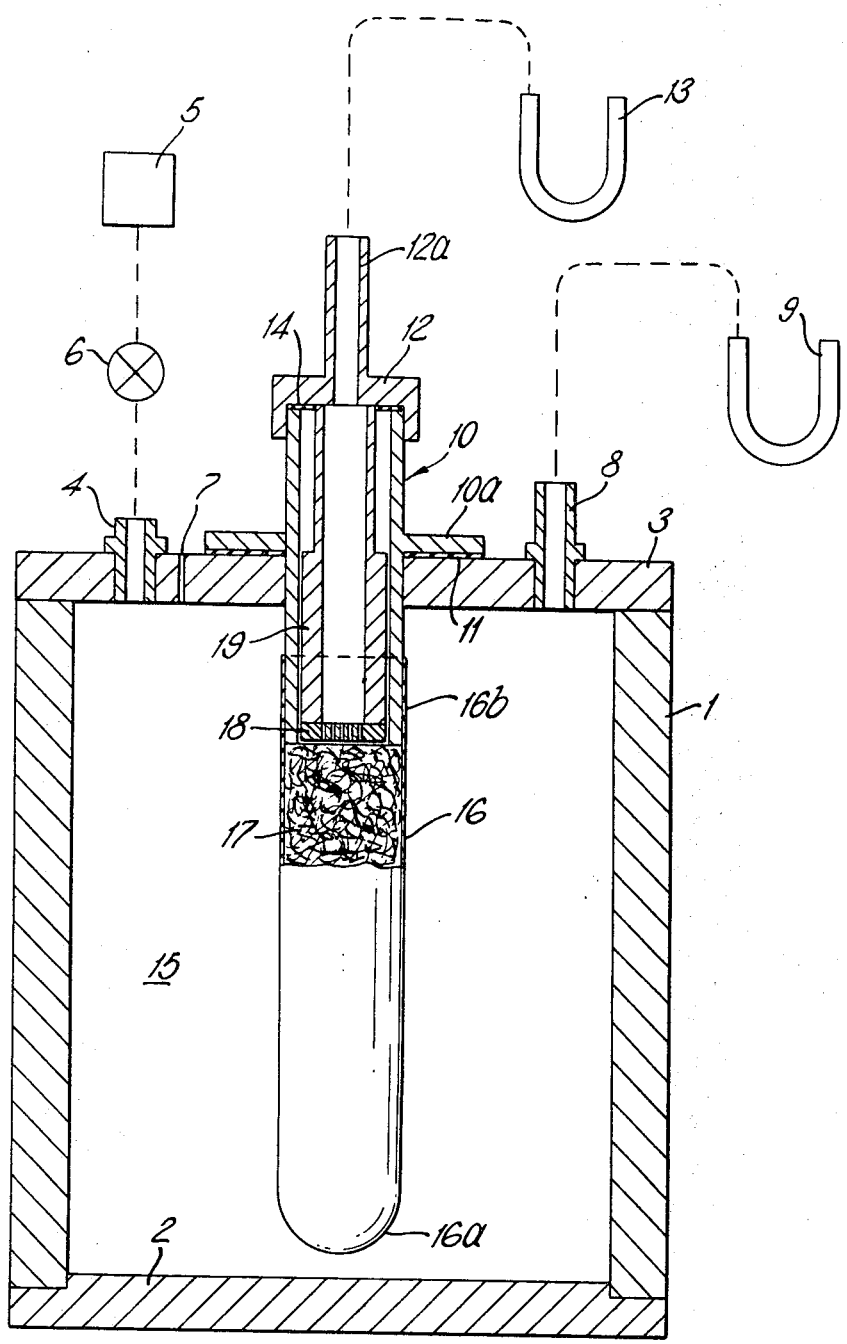
FIG. 4 is a sectional view of another different device.

Referring to FIG. 4 of the drawings, this shows a pressure chamber comprising a cylindrical body 1 of "Perspex" secured to a bottom closure disc or base 2 and a top closure disc or lid 3. The lid 3 has a inlet connection 4 to which a compressed air source 5 is connected through a pressure-reducing valve 6. The lid 3 is also provided with an air-bleed hole 7 and an outlet connection 8 leading to a manometer 9.

The connections 4, 8 and the hole 7 are disposed eccentrically in the lid 3; central of said lid a short flanged pipe generally indicated at 10 is fitted to a hole in the lid 3. Said pipe 10 has a flange 10a by which the pipe 10 is supported on the upper surface of the lid, a sealing washer 11 being accommodated under said flange. The pipe 10 is secured to the lid in any manner convenient, e.g. where low pressures are to be employed adhesive may be used on both faces of the washer 11 to secure the pipe to the lid. Where higher pressures are to be used a screw thread (not shown) may be provided on the exterior of the pipe 10 immediately below the flange 10a and the central hole in the lid 3 will then of course be a tapped hole.

Here it is convenient to note that the connections 4, 8 may as shown be short flanged pipes, generally similar to the pipe 10 although of smaller size, and the structure of these connections will therefore not be described in detail.

The upper end of the pipe 10, outside the lid 3, is closed by a cap 12 fitted with an outlet pipe 12a leading to a water manometer 13. The cap 12 is fitted with a sealing washer 14 and may be secured to the top of the pipe 10 in any convenient manner, e.g. by screw threads (not shown).

It will be noted that the drawing is diagrammatic in its representation of the compressed air source 5, the valve 6 and the manometers 9, 13, together with the connections to these parts.

The body 1, base 2 and lid 3 enclose a pressure chamber 15 in which the air pressure may be set at any desired value by operation of the valve 6, employing manometer 9 to verify that a desired pressure has been established.

Within the pressure chamber 15, however, a flexible rubber diaphragm 16 defines a material chamber 17. The diaphragm 16 is in the form of a tube having one end 16a closed and the other end 16b secured to the inner end of pipe 10. The manner in which the end 16b of the rubber tube is secured to the pipe 10 depends upon the maximum pressure to be employed, where that maximum pressure is relatively low then it may be sufficient to arrange the relative sizes of the parts so that when the rubber tube 16 is fitted to the pipe 10 the end 16b has to be somewhat stretched and therefore once fitted is in tension and grips the pipe 10. In the event that the pressures employed are to the high, then the tube may be secured to the pipe 10 by some form of clamp (not shown) or any other convenient expedient.

As shown the material chamber 17 is filled with tobacco up to the level of the bottom end of pipe 10. Within the pipe 10 is provided a preforated spacer 18 carried on the lower end of a hollow rod 19. The total length of the assembly of spacer 18 and rod 19 is substantially equal to that of the pipe 10 so that, with the spacer 18 substantially level with the bottom of pipe 10 the top of the rod 19 engages the inside of cap 12. This spacer and rod serve to prevent tobacco from entering the pipe 10 while allowing passage of air between the material chamber 17 and the manometer 13 via the outlet pipe 12a.

The material of the diaphragm 16 is of such a composition and thickness that no significant external pressure is required to collapse it when there is no tobacco or other material in the chamber 17, so that when the air pressure in chamber 15 is above atmospheric pressure while the pressure within chamber 17 is equal to atmospheric pressure the volume of the chamber 17 will be determined solely by the physical characteristics, i.e. the elasticity of tobacco or other material within chamber 17, which will then of course be compressed by the diaphragm 16, urged toward by the higher air pressure in chamber 15 around it, and no correction of results obtained is needed to allow for the presence of the diaphragm.

In operation, the cap 12 is first removed, the rod 19 and spacer 18 withdrawn and tobacco or other material to be tested is placed in the material chamber 17, whereafter the parts removed are replaced. The apparatus is then in the condition illustrated and any desired pressure may be applied to the material in the material chamber by regulation of the air pressure in chamber 15. At this point it should be mentioned that, as described above and shown in the drawing, the weight of the spacer 18 and rod 19 is carried by the material in chamber 17. This is undesirable, even although these parts be relatively light, if maximum accuracy of measurement is required and in that event the top of the rod 19 may be in any convenient manner secured to the pipe 10; for example, the upper end of the rod 19 could be provided with a flange which would rest on the top of pipe 10 and then be held to it upon fitting of the cap 12, or some form of spring clip could be applied between the pipe 10 and rod 19.

At the commencement of a measuring operation, naturally, both the chamber 15 and chamber 17 will be at atmospheric pressure as this is unavoidable while the material is being inserted. After the valve 6 has been opened to a sufficient degree to give a desired air pressure in chamber 15, as read on manometer 9, the material in chamber 17 will have been somewhat compressed, the diaphragm 16 collapsing correspondingly, and some air will have been displaced from the chamber 17 to produce a corresponding displacement of the water in manometer 13. The volume change in the chamber 17, indicated directly by the volume of displaced air, can therefore be read by use of the manometer 13 which is here employed as a volume measuring device. However, before reading the displacement of the liquid in manometer 13 the preferred practice is to adjust said manometer 13 in known manner to restore the pressure within chamber 17 to atmospheric pressure. Standardization of this procedure gives for obvious reasons readings of volume changes for particular pressures in chamber 15 which are more directly usable in calculations and/or comparisons than if the manometer 13 were not adjusted before taking each reading of the volume change as in the latter case the air pressure in chamber 17 would be effective to reduce the volume change whenever the pressure in chamber 15 was increased and allowance would have to be made for this before figures indicative of the elasticity of the tobacco or other material alone could be obtained.

It will be seen that it is a simple operation with the device described to take a series of readings of the volume change in chamber 17 for each of a series of values of pressure applied to the material therein, through diaphragm 16, by various air pressures in the chamber 15 and moreover, once the air pressure in chamber 15 has been raised to a value giving the maximum compression of the material which it is required to produce, further readings may readily be taken at any desired values of air pressure in chamber 15 as the latter is progressively reduced, to give a measure of the recovery of the material under test as the compression applied to it is released.

Reference has been made to the filling of chamber 17 with tobacco or other material to the level of the bottom of pipe 10. It will be understood that in some cases it may be preferred to conduct tests on a measured weight of material and where this is done it may be desired to arrange that the pre-selected weight of material does in fact fill the chamber 17, whatever the volume of material involved. In that event it may be found advantageous to adjust the position of the tubular diaphragm 16 on the pipe 10. With the construction shown this can be done if the lid 3 is separated from the body 1 but, more conveniently, the pipe 10 may be made of slightly larger diameter for a distance below the flange 10a, the central hole in the lid 3 being correspondingly sized, so that the pipe 10 may be withdrawn through the central hole in the lid, bringing the tubular diaphragm with it without damaging the latter. Where this is done it is especially convenient if the pipe 10 is arranged with a screw thread and the central hole of the lid is tapped, as previously mentioned but not shown.

Thus it will be seen that a device embodying the invention may be of relatively simple form and yet permit testing of the elasticity of tobacco or other materials in a quick and simple manner while yet allowing considerable accuracy of measurement. A variety of changes or modifications may be made in the details of the device described and shown in the drawing. For example, where the nature of the material to be tested is such that high pressures need to be applied in the chamber 15 then the material and interconnection of the body 1, base 2 and lid 3 will need to be suitably chosen.

The device of FIG. 4 is shown testing bulk tobacco, but as an alternative it could be used to test individual cigarettes. However, the testing of individual cigarettes is facilitated by the alternative embodiments of the invention shown in FIGS. 1 to 3.

Referring now to FIG. 1 there is shown a pressure chamber 1 defined by a cylindrical body 1a of transparent material (such as that obtainable under the registered trademark "Perspex") having a base 2 and a lid 3. The base 2 has an inlet pipe 4 to which a compressed air source 5 is connected through an air control valve 6. The chamber 1 is also provided with an outlet connection 8 leading to a meter 9 for indicating the pressure in the chamber 1. A central aperture in the lid 3 is flanged to form a short tube 11 projecting into the chamber 1; through the tube 11 there extends a pipe 10 having a flange 10a which sits on the lid 3 with an interposed O-ring seal 12 providing an air-tight connection. The lid 3 has outer and inner flanges 13 and 13a respectively between which the top edge of the body 1a is received; the outer flange 13 has slots which receive pins 21 on the body 1a forming a bayonet-type connection between the lid and body. A sealing ring 15 is included to make the lid-to-body joint air-tight.

A connector 14 having an outlet stub 19 at one side is fitted to the outer end of the pipe 10, over a sealing sleeve 17, and the stub 19 is connected to one end of a pipe 18 which adjacent to its bottom end is calibrated for volume measurement, said other end being immersed in a water bath 20. The bottom end of the pipe 18 projects into the water to a precisely controlled depth of, for example, ½ inch.

The end of pipe 10 within the chamber 1 is arranged to hold a cigarette 22 to be tested; a downwardly-pointing spike 23 is provided within the bottom portion of pipe 10, which portion is of such internal diameter as to fit the cigarette 22 closely. When the cigarette is inserted into the pipe 10, the spike 23 tend to spread the end of the cigarette slightly so that it is firmly engaged with the pipe, and the end of the cigarette abuts a perforated spacer 24; the perforated spacer 24 allows unrestricted flow into the pipe 10 of air discharged from within the cigarette 22 during testing. The point of the spike should be inside the tube 10 to assist in centering the cigarette. A collapsible diaphragm 16, of generally tubular form with a closed lower end 16a, is secured by its open upper end 16b to the outside of tube 11 so as to form an envelope round the cigarette 22, thus forming within the chamber 1 a material chamber subject to any fluid pressure applied to the chamber 1. As will appear later, the diaphragm 16 should be easily collapsible, i.e. limp rather than resilient, so that substantially the whole of any externally applied pressure is transmitted to the cigarette inside it, although capable of returning or being returned to its original form when the external pressure is released; a thin rubber diaphragm satisfactorily meets these requirements.

The diaphragm 16 may be supported by a closely surrounding perforated container 32 of rigid material.

As stated the chamber is connected via pipe 4 and air control valve 6 to a compressed air source 5. The valve 6 has three operative positions "PUMP," "HOLD," and "RELEASE." In the "pump" position the air-valve 6 is set as shown in FIG. 1, with a through-channel 6b allowing air to be pumped through pipe 4 into the chamber 1. In the "hold" position a channel 6c directs the flow of air from the air source 5 to an exhaust passage 6e from which it is allowed to escape, whilst the pipe 4 is closed. In the "release" position the channel 6c allows air to flow from the chamber 1 via the pipe 4 to the exhaust passage 6e, whilst an exhaust channel 6a directs air flow from air source 5 to an outlet passage 6d. The passage 6e may be subject to suction so as to expand the diaphragm clear of the cigarette.

The water bath 20 in which the calibrated pipe 18 is immersed has an inverted reservoir 25 which is fixed in position relative to the bath and maintains the water level in the bath 20 at the level 26. The bottom edge of the reservoir just touches the water in the bath 20. If any water is lost from the bath 20, for example through evaporation, the level 26 drops below the bottom edge of the reservoir 25 so as to allow water from the reservoir to flow into the bath so as to restore the water level 26 to its former desired position. It will be appreciated that there is a partial vacuum in the space 25a at the top of the reservoir corresponding to the head of water in the reservoir.

Air flowing through the tube 18 passes as bubbles 27 into the water of the bath 20. FIG. 2 shows an arrangement for counting these bubbles 27 which may be termed a photo-detector and comprises a light source 28 and a photo-electric cell 29 so arranged that the passage of a bubble 27 causes an electric pulse to be emitted by the cell 29, these pulses being fed to a counter (not shown).

A cigarette 22 to be tested is placed on the spike 23 in the pipe 10 and in contact with the nozzle 24. The pipe 10, which is connected via the connector 14 to the calibrated tube 18, is lowered into the chamber, guided by the tube 11 so that the flange 10a engages the seal 12 on the lid 3. The air-valve 6 is set to "pump" so that air from the air pressure source 5 is steadily pumped into the chamber to deflate the diaphragm so that it closely envelopes the cigarette 22. During this period, any water in tube 18 will be ejected, and the air expelled from the diaphragm will pass through the cigarette 22 to the tube 18 and be released in the bath 20 as air bubbles 27. When the air surrounding the cigarette in the diaphragm 16 has been expelled the bubbles 27 will cease temporarily until the pressure in the chamber equals the filling pressure P, of the cigarette (the "filling pressure" P being the pressure exerted on the cigarette wrapping by the tobacco filling). Until the pressure in the chamber exceeds the pressure $P_1$ no significant compression of the cigarette can take place. Immediately the bubbles 27 first reappear, the pressure in the chamber is recorded as the value of $P_1$, and a count of the bubbles appearing at the end of the tube 18 is started. The pressure is further increased to a predetermined fixed level (8″ Hg is suggested) where the air-valve is turned to "hold" and the pressure ($P_2$) recorded. The bubble count is maintained until bubbles cease to appear. From the bubble counter on the photo-detector the volume of air corresponding to the compression of the cigarette can be computed since if there are $n$ bubbles of volume $v$ (which is determined by the aperture in the tube 18) the reduction in volume which the cigarette undergoes during the chamber pressures rise from $P_1$ to $P_2$ is $nv=V_1$.

A further characteristic of the cigarette, termed its "recovery," can be ascertained. If the air pressure in the chamber is allowed to return to atmospheric pressure by releasing the air in the chamber, the cigarette will partly return to its former volume, bringing back air from calibrated tube 18. Consequently, water rises up the tube 18 giving a direct reading of the volume increase ($V_2$) of the cigarette.

The characteristics of the cigarette thus determined are filling pressure (which is approximately $P_1$), firmness as given by $V_1/(P_2-P_1)$ and percentage recovery as given by $V_2/V_1 \times 100$.

In order to determine the volume (V) of the bubbles it suffices to apply suction to the chamber 1 so as to draw fluid up into the graduated tube 18. Gentle pressure applied to chamber 1 will then cause bubbles to emerge which can be counted while the fluid level falls from one graduation to another.

FIG. 3 shows an alternative construction which enables cigarettes to be tested in rapid succession. In this example a cigarette 38 to be tested is inserted into a tubular holder 40 after separating from an annular part 42 a head member 44 to which the holder 40 is connected. There is a cylindrical transparent body 46 defining a pressure chamber containing a tubular diaphragm 48, as in the previous example, both of these parts being connected to the annular part 42.

When the annular part 42 and head member 44 are placed together as shown, two sealing rings 50 and 52 define between them an annular space through which compressed air (or other gas) is delivered to the pressure chamber 54 via a control valve 56, a pipe 58, a restricted passageway 60 in the head member 44 and a passageway 61 in the annular member 42. As the diaphragm collapses, air is driven out of the material chamber, passing through the cigarette and via passages in a nozzle portion 62 (as before) and through a passageway 64 in the head member 44 to a discharge pipe 66. As in the previous example, the pipe 66 leads to a bubbler bath 68. From the pressure chamber a pipe connection 70 leads to a device 72 which registers the air pressure. A pen 74 moves vertically according to the air pressure and marks a trace on a roll of paper 76 which is wound at a constant speed from a drum 78 to a drum 80. Accordingly each trace, for example the completed trace 82, is a graph of pressure against time. The arrangement is shown in the course of producing a second trace 84. A photo-electric cell 69 is located next to the path of bubbles (as in the previous example) and is electrically connected to the device so as to impart a kick to the pen whenever a bubble is released.

It will be seen that the completed trace 82 shows a jagged initial zone 86 followed by a relatively smooth line terminated by a single discontinuity at 88. The zone 86 occurs as bubbles are driven out rapidly owing to the diaphragm collapsing onto the cigarette. This is followed by a period during which the pressure builds up to the filling pressure of the tobacco in the cigarette, during which there are no bubbles. The next bubbles which produces the mark 88 on the trace occurs just after the pressure has passed the filling pressure of the tobacco. The pressure at this point, indicated by the height of the mark 88 above a datum line 90, is greater than the filling pressure by an amount dependent upon the firmness of the tobacco filling.

In use, before the annular member 42 and head member 44 are separated, a rotary valve member 92 in the valve 56 is turned from the position shown, in which the pipe 58 is connected to a compressed air source (not shown), to a position shown in dotted lines, in which the pipe 58 is connected to suction. This expands the diaphragm which would otherwise still be closely enveloping and possibly gripping the cigarette. After a short application of suction, the members 42 and 44 can be separated so that the cigarette can be replaced by another cigarette to be tested. A rapid succession of tests can be conducted in this way to produce a succession of traces on the paper 76.

Instead of being held by the spike and surrounding tube, the cigarette may simply be dropped into the diaphragm. In this case care should be taken (for example by extending the nozzle portion 62 and rounding off the end) to ensure that the diaphragm cannot shut off the discharge of air from the cigarette.

Testing according to this invention may be partially or completely automated. For example, there may be say two stations at which loading and testing are respectively carried out, so that one tester is being loaded with a cigarette while the other is being tested. The separation and rejoining of the two parts of each tester may be carried out by means of an automatically controlled ram.

In one possible form of automatic tester there are two tester units, each comprising a cigarette holder 40, mounted on opposite ends of an arm which includes the head portions 44 and is pivoted centrally about an axis parallel to the axes of the holders 40 of the tester units. The arm is rotated intermittently through 180° so that each tester unit in turn passes successively a loading station where the previously tested cigarette is removed and is replaced by a fresh cigarette to be tested, and an actual testing station where a unit comprising the annular member 42 the pressure chamber and the diaphragm is moved into the testing position (for example by an automatically controlled ram). At the testing station pressure is first supplied to the pressure chamber to produce a trace on the paper 76, and then suction is applied to free the cigarette before the pressure chamber and diaphragm unit is separated from the arm to enable the arm to be rotated through 180° back to the loading station. The shaft about which the arm is rotated may be hollow and may serve as a pipe connection leading through passageways extending to the ends of the arm to one of the pipe connections of the tester, for example the pipe connection 66 or even one of the fluid connections 58 or 70.

In the case of a filter tip cigarette, the filter tip itself may be enclosed within the tubular holder 40 during testing so as not to be compressed by the fluid pressure in the pressure chamber.

What I claim as my invention and desire to secure by Letters Patent is:

1. A device for testing the physical characteristics of tobacco and like materials, comprising a pressure chamber, means for supplying fluid under pressure to the pressure chamber, a material chamber separated from the pressure chamber by a flexible diaphragm impermeable to the fluid, a bubbler bath containing a liquid, and a flow connection from the material chamber to a point below the surface of liquid in the bubbler bath, so that a reduction in the volume of the material chamber as a result of fluid pressure in the pressure chamber during use causes air to be given out of the material chamber and to bubble out in the bubbler bath.

2. A device according to claim 1 including means for detecting the bubbles released in the bubbler bath during use.

3. A device according to claim 2 which the bubble detector comprises a light source and a photo-electric cell facing one another on opposite sides of the path of bubbles through the liquid in the bath.

4. A device according to claim 1 including means for indicating the pressure of fluid in the pressure chamber.

5. A device according to claim 4 with a pressure recorder which records each pressure at which a bubble breaks away in the bubbler bath.

6. A device according to claim 5 in which the pressure recorder is arranged to mark a trace on a steadily moving length of paper or the like, the position of the trace laterally with respect to the direction of movement of the paper being dependent upon pressure, and including a photoelectric cell which emits a signal when a bubble breaks in the bubbler bath, this signal being fed to the pressure recorder to produce a sharp discontinuity in the trace to indicate the pressure at which the bubble broke away.

7. A device according to claim 1 in which the diaphragm is tubular and lies within the pressure chamber, the diaphragm and the body defining the pressure chamber being secured to a member which, during testing, is brought together with a head member defining a fluid pressure inlet passage and a passage through which air is discharged from within the tubular diaphragm.

8. A device according to claim 7, including means for connecting the pressure chamber to suction to expand the tubular diaphragm after testing.

9. A device for measuring the compressibility of a cigarette comprising a pressure chamber having an inlet opening for the intersection of a cigarette, a flexible tubular sack of fluid-impermeable material integrally closed at one end and having an opening at the other end secured in a fluid-tight manner around said inlet opening of the pressure chamber, removable closure means for closing said inlet opening and further defining a discharge passageway for the discharge of air from the interior of the sack when a cigarette in the sack is compressed by pressure fluid in the pressure chamber, means connected to said discharge passageway for indicating the volume of air discharged during testing, means for indicating the fluid pressure in the pressure chamber, means for supplying fluid under pressure to said pressure chamber when a cigarette is in position in the sack, whereby the sack including the closed end portion collapses against the cigarette and then compresses the cigarette so as to discharge through said discharge passageway air contained within the cigarette.

10. A device according to claim 9 including means for locating and holding a cigarette within the material chamber.

11. A device according to claim 9 in which the closure member includes means for supporting the cigarette.

12. A device according to claim 11 in which said support means comprises a spike for impaling the cigarette.

13. A device according to claim 9 further comprising rigid means closely surrounding and supporting said sack in said pressure chamber.

14. A device according to claim 9 further comprising means for connecting said pressure chamber to suction to expand the sack after testing said cigarette.

15. A method for testing and recording the filling pressure of a cigarette comprising the steps of progressively increasing fluid pressure applied to the exterior of said cigarette to expel air from the filling of the cigarette, directing said air as it is expelled from said cigarette through a liquid bubbler bath, continuously recording on a chart against elapsed time both said progressive increase in fluid pressure and the formation of each successive bubble of expelled air in said bath whereby the fluid pressure equal to the filling pressure of the cigarette is determined.

References Cited
UNITED STATES PATENTS

| 3,115,772 | 12/1963 | O'Keefe et al. | 73—94 |
| 3,199,341 | 8/1965 | Hever et al. | 73—94 |

CLEMENT SWISHER, Primary Examiner